United States Patent Office 3,709,949
Patented Jan. 9, 1973

3,709,949
ISOMERIZATION OF 1,2-DICHLORO-3-BUTENE TO 1,4-DICHLORO-2-BUTENE
Ronnie D. Gordon and Charles M. Starks, Ponca City, Okla., assignors to Continental Oil Company, Ponca City, Okla.
No Drawing. Filed June 7, 1971, Ser. No. 150,721
Int. Cl. C07c 21/04
U.S. Cl. 260—654 R          6 Claims

ABSTRACT OF THE DISCLOSURE 1,2-dichloro-3-butene is isomerized to 1,4-dichloro-2-butene in the presence of a carbon catalyst.

BACKGROUND OF THE INVENTION

Field of the invention

The present invention relates to the production of 1,4-dichloro-2-butene. In one aspect the present invention relates to a process for isomerization of 1,2-dichloro-3-butene to 1,4-dichloro-2-butene. In yet another aspect the present invention relates to the production of 1,4-dichloro-2-butene by allylic rearrangement of 1,2-dichloro-3-butene using a relatively high surface area carbon catalyst.

Brief description of the prior art 1,4-dichloro-2-butene and 1,2-dichloro-3-butene are products generally formed by the chlorination of butadiene. 1,4-dichloro-2-butene is an important intermediate in the preparation of adipic acid, butenediol, and other valuable products. In addition, owing to the readiness with which the chlorine atoms of 1,4-dichloro-2-butene can be exchanged great industrial interest has developed in this isomeric product because of the synthetic organic chemicals which one can produce from such an intermediate.

Attempts have been made heretofore to provide processes wherein the isomeric products resulting from the chlorination of butadiene can be converted into a single relatively pure compound. For example, many processes have been proposed for the isomerization of 1,2-dichloro-3-butene to 1,4-dichloro-2-butene, such as the use of the condensation and polymerization catalyst. Examples of such catalysts are $FeCl_3$, $TiCl_2$, and $AlCl_3$. However, when employing such catalysts, elaborate precautions have had to be taken in order to avoid undesirable side reactions such as the polymerization or condensation of the unsaturated organic chlorides. Further, the procedures employing such metallic halide condensing agents have suffered from the disadvantage of low yields due to the occurrence of extensive dehydrochlorination and degradative side reactions.

Other prior art processes have proposed that the transposition to the 1,4-dichloro-2-butene be carried out in the absence of catalysts at elevated temperatures. However, the prolonged heating necessary to obtain the conversion to the desired isomer has also led to excessive dehydrochlorination and undesired side reactions.

In efforts to overcome these problems of excessive dehydrochlorination and degradative side reactions other processes have been proposed by the prior art which call for exotic catalyst systems such as zirconium fluoride catalysts and the like. However, when employing such catalysts the conversion of the isomeric products to the desired isomer has not attained the degree sought and required. Therefore, new and novel processes are constantly being sought which will allow the production of a desired isomer from the isomeric mixture of dichlorobutene produced by chlorination of butadiene. It is especially desirable that a process be developed for the allylic rearrangement of 1,2 - dichloro - 3 - butene to 1,4-dichloro-2-butene. One such novel process is disclosed in the copending patent application Ser. No. 131,771 of Ronnie D. Gordon entitled "Isomerization of 1,2 - Dichloro- 3 - Butene to 1,4 - Dichloro - 2 - Butene," filed Apr. 4, 1971 wherein organic quaternary salts are employed as the catalyst in the allylic rearrangement of the 1,2-dichloro-3-butene. However, additional improved processes are desired which do not depend on the use of such complex catalyst systems.

OBJECTS OF THE INVENTION

An object of the invention is to provide an improved process for producing 1,4-dichloro-2-butene.

Another object of the present invention is to provide an improved process for the allylic rearrangement of 1,2-dichloro-3-butene to 1,4-dichloro-2-butene.

Another object of the present invention is to provide a process for the allylic rearrangement of 1,2-dichloro-3-butene to 1,4-dichloro-2-butene which employ an inexpensive, readily available catalyst, which does not require the use of solvents and which does not produce product contamination problems.

Another object of the present invention is to provide a process for producing 1,4-dichloro-2-butene which does not suffer from the disadvantage of the prior art and which is highly selective to the production of 1,4-dichloro-2-butene at yields of commercial significance.

These and other objects, advantages, and features of the present invention will be apparent to those skilled in the art from a reading of the following description.

SUMMARY OF THE INVENTION

In accordance with the present invention, it has been found that carbon catalysts have the property of catalyzing the allylic rearrangement of 1,2-dichloro-3-butene to 1,4-dichloro-2-butene so as to effect formation of the desired product in high yields, with ultimate selectivity, while maintaining at a minimum the formation of undesired by-products.

Further, according to the invention a novel process is provided for the allylic rearrangement of 1,2-dichloro-3-butene to 1,4-dichloro-2-butene wherein the 1,2-dichloro-3-butene is heated at a temperature in the range of about 25 degrees C to about 200 degrees C in the presence of a catalytic amount of a high surface area carbon catalyst for an effective period of time to allow said allylic rearrangement.

DESCRIPTION OF THE PREFERRED EMBODIMENTS

As previously stated, we have now found that a carbon catalyst can be employed as the catalyst constituent in the allylic rearrangement of 1,2-dichloro-3-butene to 1,4-dichloro-2-butene. Advantages of the use of a carbon catalyst for the dichlorobutene isomerization are that carbon is an inexpensive catalyst, no solvent is required for the reaction to occur, and no metal residue is left in the reaction mixture.

The carbon catalyst which can be employed in the allylic rearrangement of 1,2-dichloro-3-butene to 1,4-dichloro-2-butene in accordance with the process of the present invention can be a suitable carbon catalyst having a large surface area. The source of the carbon catalyst can vary widely and can be from any suitable source such as charcoal, carbon black, coke, and the like. Generally the carbon will have a surface area of from about 200 m.$^2$/g. to about 2000 m.$^2$/g. Especially desirable is a carbon catalyst having a surface area of from about 800 m.$^2$/g. to about 1200 m.$^2$/g.

The amount of the carbon catalyst employed for the allylic rearrangement of 1,2-dichloro-3-butene to 1,4-dichloro-2-butene can vary widely, the only requirement being that a catalytic amount of the carbon catalyst be present to allow the allylic rearrangement to occur. Generally the carbon catalyst is employed in an amount ranging from about 0.01 to about 10% by weight of the 1,2-dichloro-3-butene. Desirable results have been obtained wherein the amount of the organic quaternary salt catalyst employed is from about 0.01 to about 5% catalyst based on the weight of the 1,2-dichloro-3-butene.

The pressure at which the reaction of the present invention can be carried out can vary widely, generally being in the range of from atmospheric pressure to about 200 p.s.i. Generally, it is desirable that the pressure range be from atmospheric to about 50 p.s.i., with atmospheric pressure being preferred for the sake of convenience. When employing a pressure in the range of from atmospheric to 200 p.s.i. the temperature of the reaction can vary between about 25 degrees C. to about 200 degrees C. However, desirable results have been obtained where the reaction is carried out at a temperature in the range of about 90 degrees C. to about 150 degrees C. and pressure is within the range of from atmospheric to about 50 p.s.i. Especially desirable results have been obtained wherein the reaction is carried out under reflux conditions.

The duration of the reaction will also vary widely depending upon the amount of catalyst employed, as well as the reaction conditions. Generally when the reaction is completed one will notice a temperature increase due to the formation of the isomeric product. This increase is due, in part, to the fact that 1,4-dichloro-2-butene has a higher boiling point than the 1,2-dichloro-3-butene. Generally from about 1 to about 8 hours are sufficient for the isomerization to occur. However, additional time will not adversely affect the isomerization product.

The process of the present invention can be carried out employing a batch type process or a continuous type process. In a batch type process 1,2-dichloro-3-butene or a mixture of 1,2-dichloro-3-butene is charged with the carbon catalyst to a reaction zone and heated in liquid phase, preferably under reflux conditions. When reflux conditions are employed, the reaction mixture is maintained under such conditons until substantial conversion of the 1,2-dichloro-3-butene has been affected which is indicated generally by a rise of temperature in the reaction zone. Generally the reaction time will vary from about 1 to 8 hours. The refluxed material e.g., 1,4-dichloro-2-butene is then recovered from the reaction zone and separated from the carbon catalyst. The product so separated can then be further purified, if desired, by any suitable means such as distillation and the like.

The process of the present invention may also be continuously carried out by feeding the 1,2-dichloro-3-butene or mixture containing same to a reaction zone containing the carbon catalyst in suspended form and continuously withdrawing the 1,4-dichloro-2-butene product from the reaction zone. Likewise, the starting material may be constantly percolated downward through a reactoin zone packed with the carbon catalyst and the 1,4-dichloro-2-butene continuously withdrawn from the base of the reaction zone.

As previously stated, it is desired that the reaction be carried out in the liquid phase. However, as is evident to those skilled in the art, the reaction can be carried out by passing 1,2-dichloro-3-butene in vapor form downwardly through the catalyst. In addition, when employing a vapor phase process it may be desirable to admix the 1,2-dichloro-3-butene with an inert diluent gas, such as nitrogen. The exit gases from the heated tube, which will be a mixture of the 1,4-dichloro-3-butene and the inert carrier gas, are passed through a condenser to liquefy the 1,4-dichloro-2-butene and thus separate same from the inert gas. If desired, the condensed product can then be additionally treated such as by fractional distillation and the like to purify the product.

In order to more fully described the present invention the following examples are given. However, it is to be understood that the examples are for illustrative purposes only and are not intended to be a limitation on the invention.

EXAMPLE 1

125 grams (1 mole) of 1,2-dichloro-3-butene and 0.5 gram of high activity charcoal having a surface area of about 1000 m.$^2$/g. were charged to a 300 ml. flask fitted with a reflux condenser and a thermometer. The reaction mixture was then heated to its reflux temperature of 123 degrees C. The progress of the reaction was followed by gas chromatographic analysis and by noting that the temperature increased as the 1,4-dichloro-2-butene was formed.

After six hours reaction time, the reaction was about 70% complete with 100% selectivity to 1,4-dichloro-2-butene.

EXAMPLE 2

50 grams (0.4 mole) of 1,2-dichloro-3-butene and 0.3 gram of high activity charcoal having a surface area of about 1000 m.$^2$/g. were charged to a stainless steel autoclave and the mixture was heated to 100 degrees C. The progress of the reaction was followed by gas chromatographic analysis, after a reaction time of six hours 45% of the 1,2-dichloro-3-butene had been converted to the desired 1,4-dichloro-2-butene.

The above data clearly indicate the isomerization of 1,2-dichloro-3-butene to 1,4-dichloro-2-butene employing the carbon catalyst of the present invention. Further, the data indicate that the most desirable results in the conversion of the 1,2-dichloro-3-butene to 1,4-dichloro-2-butene was obtained when the reaction was carried out under reflux conditions.

In addition, it should be understood that certain changes may be made in carrying out the above process without departing from the scope of the invention and, it is intended that all matter in the above description shall be interpreted as being illustrative and not in a limiting sense.

Having thus described the invention, we claim:

1. A method for converting 1,2-dichloro-3-butene to 1,4-dichloro-2-butene which comprises contacting said 1,2-dichloro-3-butene with a catalytic amount of a carbon catalyst at a temperature in the range of from about 25 degrees C. to about 200 degrees C. for an effective period of time to allow allylic rearrangement of said 1,2-dichloro-3-butene to said 1,4-dichloro-2-butene and recovering said 1,4-dichloro-2-butene.

2. The method of claim 1 wherein said contacting is carried out at a pressure within the range of atmospheric pressure to about 200 p.s.i. and said carbon catalyst has a surface area in the range of about 200 m.$^2$/g. to 2000 m.$^2$/g.

3. The method of claim 2 wherein said catalyst is present in an amount within the range of about 0.01 to 10 weight percent based on the weight of said 1,2-dichloro-3-butene.

4. The method of claim 3 wherein said 1,2-dichloro-3-butene is contacted with from about 0.1 to 5 weight percent of said catalyst having a surface area in the range of about 800 m.$^2$/g. to 1200 m.$^2$/g. at a temperature in the range of about 90 degrees C. to about 150 degrees C. and at a pressure in the range of atmospheric pressure to about 50 p.s.i.

5. The method of claim 4 wherein said 1,2-dichloro-3-butene is heated under reflux conditions for a period of from about 1 to 8 hours at atmospheric pressure.

6. The method of claim 5 wherein the reflux temperature is about 123 degrees C. and said carbon catalyst is charcoal having a surface area of about 1000 m.$^2$/g.

References Cited

UNITED STATES PATENTS 2,446,475  8/1948  Hearne et al. _____ 260—654 R

BERNARD HELFIN, Primary Examiner

J. A. BOSKA, Assistant Examiner